United States Patent [19]

Konneker

[11] Patent Number: 4,740,788
[45] Date of Patent: Apr. 26, 1988

[54] METHOD OF PROVIDING LOCATION DEPENDENT VISITOR DISPATCHING SERVICE

[76] Inventor: Lloyd K. Konneker, 635 Hearon Dr., Stone Mountain, Ga. 30088

[21] Appl. No.: 915,755

[22] Filed: Oct. 6, 1986

[51] Int. Cl.⁴ .................. G08B 5/22; H04M 3/42; H04M 11/00
[52] U.S. Cl. .................. 340/825.44; 340/825.49; 379/57; 379/211
[58] Field of Search .............. 340/825.49, 825.44, 340/539; 379/57, 211, 210, 38

[56] References Cited

U.S. PATENT DOCUMENTS

| 3,439,320 | 4/1969 | Ward | 367/191 |
| 3,739,329 | 6/1973 | Lester | 367/6 |
| 4,225,953 | 9/1980 | Simon et al. | 367/117 |
| 4,275,385 | 6/1981 | White | 340/825.49 |
| 4,307,859 | 12/1981 | Hayashi et al. | 246/124 |
| 4,313,035 | 1/1982 | Jordan et al. | 379/207 |
| 4,495,496 | 1/1985 | Miller, III | 340/825.54 |
| 4,601,064 | 7/1986 | Shipley | 455/608 |
| 4,658,357 | 4/1987 | Carroll et al. | 364/406 |

FOREIGN PATENT DOCUMENTS 965179 3/1975 Canada ............ 340/825.49

OTHER PUBLICATIONS

U.S. application No. 811,991 filed 12-23-85 by Konneker.

Primary Examiner—Thomas W. Brown

[57] ABSTRACT

A method is disclosed of using a personnel locating system and a plurality of visitor stations to provide location dependent visitor dispatching service for visited subscribers. In accordance with the service, a subscriber may provide that a visitor directed to a personal number unique to the subscriber be dispatched in different manners according to the location of the subscriber when the visitor arrives. A personnel locating system tracks subscribers and provides the location of subscribers to a database. A visitor station where a visit is initiated sends the personal number unique to the visited party to the data base. The database accesses the current location of the visited party. The database accesses information that specifies a method of visitor dispatchment according to the current location of the visited party. The methods of visitor dispatchment include paging the visited party and displaying a message at the visitor station.

6 Claims, 4 Drawing Sheets

FIG. 4

LOCATION DEPENDENT VISITOR DISPATCHMENT MEMORY TABLE
VDN 583-1000

| ROW | | | |
|---|---|---|---|
| 0 | CURRENT LN | | |
| 1 | PIN - 9446 | | |
| 2 | DEFAULT VISITOR DISPATCHMENT STATUS | | |
| | UNAV | PAF | ... |
| 3 | LOCATION DEPENDENT VISITOR DISP. STATUS | | |
| | UNAV | PAF | ... |
| ⋮ | | | |
| N | LOCATION DEPENDENT VISITOR DISP. STATUS | | |
| | UNAV | PAF | ... |

METHOD OF PROVIDING LOCATION DEPENDENT VISITOR DISPATCHING SERVICE

TECHNICAL FIELD

The invention pertains to office paging systems and personnel locator systems in general, and particularly to the provision of a new service whereby a subscriber may control the dispatchment of visitors to the subscriber. In particular, the method allows a subscriber to control the dispatchment of visitors based on the location of the subscriber when a visitor arrives.

BACKGROUND OF THE INVENTION

It has long been considered desirable to allow workers in a building to be located and to be paged. Personnel locator systems taught in White U.S. Pat. No. 4,275,385 and in Lester U.S. Pat No. 3,739,329 provide for the location of subscribers to be monitored, for calls to subscribers to be routed to the phone nearest a subscriber, for subscribers to be alerted by means located near the subscriber, and for the location of subscribers to be displayed.

In general, such arrangements allow for calls and pages to a subscriber to be routed to a communication or alerting means nearest the current location of the subscriber. The arrangments described above are limited in that the subscriber may not control whether the routing will occur. It is inconvenient for the subscriber to be called or paged no matter where the subscriber is. For example, it is inconvenient for the subscriber to be paged when the subscriber is in a bathroom or conference room. It is desirable that the subscriber be able to specify a method of completing calls and pages for each location. It is also desirable that the subscriber be able to easily change the specification.

Also, it has long been considered desirable to allow office workers as much control as possible in the processing of calls, thereby reducing the need for operators and enhancing the efficiency of telephone communication. In particular, it is desirable for called parties to be able to control the disposition of calls directed to them. A personal locator service taught in Jordan and Weber U.S. Pat. No. 4,313,035 provides subscriber control of a host of telephone services.

In general, such arrangements allow a subscriber to make an update transaction to a data base to store a call completion status that will then direct the completion of calls directed to the subscriber. Such arrangements are limited in that only completion status for telephone calls may be stored, and not completion status for visitors. Also, the arrangements described above are limited in that one call completion status is usually only useful while the subscriber is in one location. It is inconvenient to require the subscriber to update his completion status at the data base whenever the subscriber changes location.

SUMMARY OF THE INVENTION

The aforesaid problems have been solved in a method of providing location dependent visitor dispatching service. The method is implemented in a stored program controlled system having a database, a data communications network interconnecting the database with a plurality of visitor stations, a data communications network interconnecting the database with a paging system, and a data communications network interconnecting the database with a personnel locating system. Information specifying the status of the subscriber for visitor dispatchment is stored at the data base. The information includes a status for visitor dispatchment for the subscriber for each of a plurality of locations at which the subscriber might be located. The status information at the database specifies in general a method in which a visitor to the subscriber is to be dispatched. The status information may be modified at any time under direct control of the subscriber. Information giving the location of the subscriber is also stored at the data base. Information in the data base giving the location of the subscriber is updated by the personnel locating system.

When a visitor arrives to see a subscriber, the visitor may indicate a desire to see the subscriber by pushing a button at a visitor station near the subscriber's office door. In response, the data base is addressed to determine the location of the subscriber. Upon determination of the location of the subscriber, the data base is again addressed to determine the status of the subscriber for visitor dispatchment at said location. If the status of the subscriber for visitor dispatchment indicates that the subscriber is at a location where the subscriber desires to receive visitors, the visitor is dispatched to that location by displaying a message at the visitor station. If the status of the subscriber for visitor dispatchment indicates that the subscriber is at a location where the subscriber desires to be paged, the subscriber is paged. If the status of the subscriber for visitor dispatchment indicates that the subscriber is at a location where the subscriber is unavailabe for visitors, the visitor is informed of the unavailability of the subscriber. Many other methods of visitor dispatchment may be provided.

BRIEF DESCRIPTION OF THE DRAWINGS

FIG. 4 shows one illustrative layout of a memory table located at the data base of FIG. 1 and containing location information and other information pertaining to one subscriber of location dependent visitor dispatching service.

DETAILED DESCRIPTION

Figure 1:
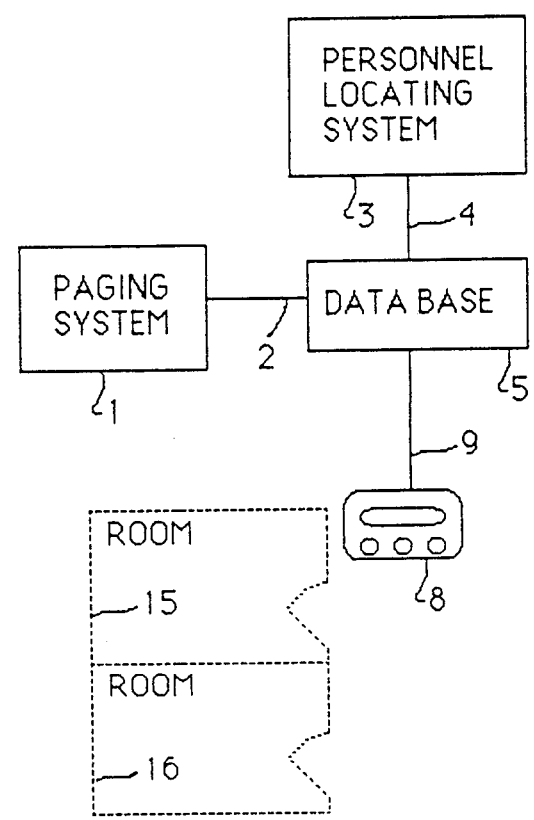
FIG. 1 shows, in block diagram form, a configuration of a data base, a paging system, a personnel locating system, a plurality of visitor stations, and data communication networks for location dependent visitor dispatching.

The location dependent visitor dispatching service is generally shown in FIG. 1 and, in general, includes: a data base 5; a paging system 1; a data communication network 2 interconnecting said data base and said paging system; a personnel locating system 3; a data communication network 4 interconnecting said personnel locating system and said data base; a plurality of visitor stations 8; and a data communication network 9 interconnecting said data base and said visitor stations. The paging system 1 may be any of several well known wireless systems for signaling persons and for receiving signals from persons. In general such paging systems include a base station and a plurality of paging units. The paging units are carried on the person of subscribers and receive signals from the base station and alert the subscriber. In the preferred embodiment, the paging units of the paging system are also capable of sending signals to the base station in response to actions of the subscriber. The personnel locating system 3, for example, may be such as the Infrared Personnel Locator System taught by White U.S. Pat. No. 4,275,385. The function of the personnel locator system is to provide the location of subscribers. The data base 5, for example, may comprise a Western Electric Company, Inc., 1 A processor (disclosed in Bell System Technical Journal No. 7, Feb. 1977), equipped with disk storage and a system of programs to establish, edit, interpret, and manage information stored in memory. The visitor stations 8 are data terminals allowing the entry of data and the display of data.

With reference to FIG. 1, the method is described by assuming that a subscriber A subscribes to location dependent visitor dispatching (LDVD) service and is beginning a new job in a building in which the location dependent visitor dispatching service is provided. Subscriber A has assigned to him a Visitor Dispatching Number (VDN) which is unique to him. We assume subscriber A has been assigned to office room 15 with visitor station 8 outside the door and that subscriber A also occasionally works in room 16. Each of rooms 15 and 16 are assigned a Location Number (LN), which uniquely identifies the locus of the room within the area monitored by personnel locating system 3. Illustratively, the location number is a three digit number, the location number of room 15 is 222, and the location number of room 16 is 223.

Prior to commencing work, subscriber A might wish to provide that all his visitors who arrive while he is room 15 be dispatched by announcing to the visitor that subscriber A is unavailable. To arrange this, subscriber A initiates a visitor dispatchment update transaction. We assume that subscriber A has been issued a pager unit for receiving and sending signals via the paging system. In the preferred embodiment, the updata transaction is initiated at the paging unit. At the paging unit, subscriber A presses a button labeled "update" and then keys in the LN for room 15, in this example 222, and a three digit access code. In response, the paging system composes a data message comprising the digits 37 700", the VDN of subscriber A, in this example 583-1000, a Personal Identification Number (PIN), the LN keyed in by subscriber A, and the access code keyed in by subscriber A. The paging system then transmits the data message to the data base 5 over data communication network 2. The "700" digits identify this transaction as involving visitor dispatching service. This is one illustrative way of identifying such transactions. The PIN is assigned to subscriber A at the time of subscription to LDVD service and is assumed to be the digits "9446"; the PIN is correlated with the unique VDN for verification as will be seen. The LN identifies the location for which the visitor dispatchment status is to be updated. The access code identifies the transaction as a certain type of LDVD update transaction and may, as assumed here, consist of the digits "111" for an "unavailable" visitor dispatchment updata transaction.

Data base 5 recognizes from the "700"digits that the received data message pertains to a LDVD type of transaction. Accordingly, program control is given to a location dependent visitor dispatching program which is flowcharted in FIGS. 2 to 3. Program execution begins at program address LDVDSTART in FIG. 2.

Each subscriber whose LDVD records are maintained in data base 5 has assigned a memory table in the data base memory. One illustrative organization of such a table for subscriber A is shown in FIG. 4. The address of the memory table is derived by the data base from the VDN. The first row of the table contains a Current Location Number (CLN) identifying the current location of subscriber A. The second row contains the subscriber PIN, here assumed to be 9466. The third row contains a default status for visitor dispatchment to be used in the event that subscriber A has not provided a visitor dispatchment status for some location, as will be seen. The remainder of the table comprises one Location Dependent Visitor Dispatchment Status (LDVDS) row for each location for which subscriber A wishes to specify a visitor dispatchment status. The address of each LDVDS row of the memory table is derived by the data base from a LN. Each LDVDS row contains a number of control flags which direct the data base program and words indicating how visitors to subscriber A are to be dispatched. Any number of such flags and words having any desired meaning may be provided.

Figure 2:
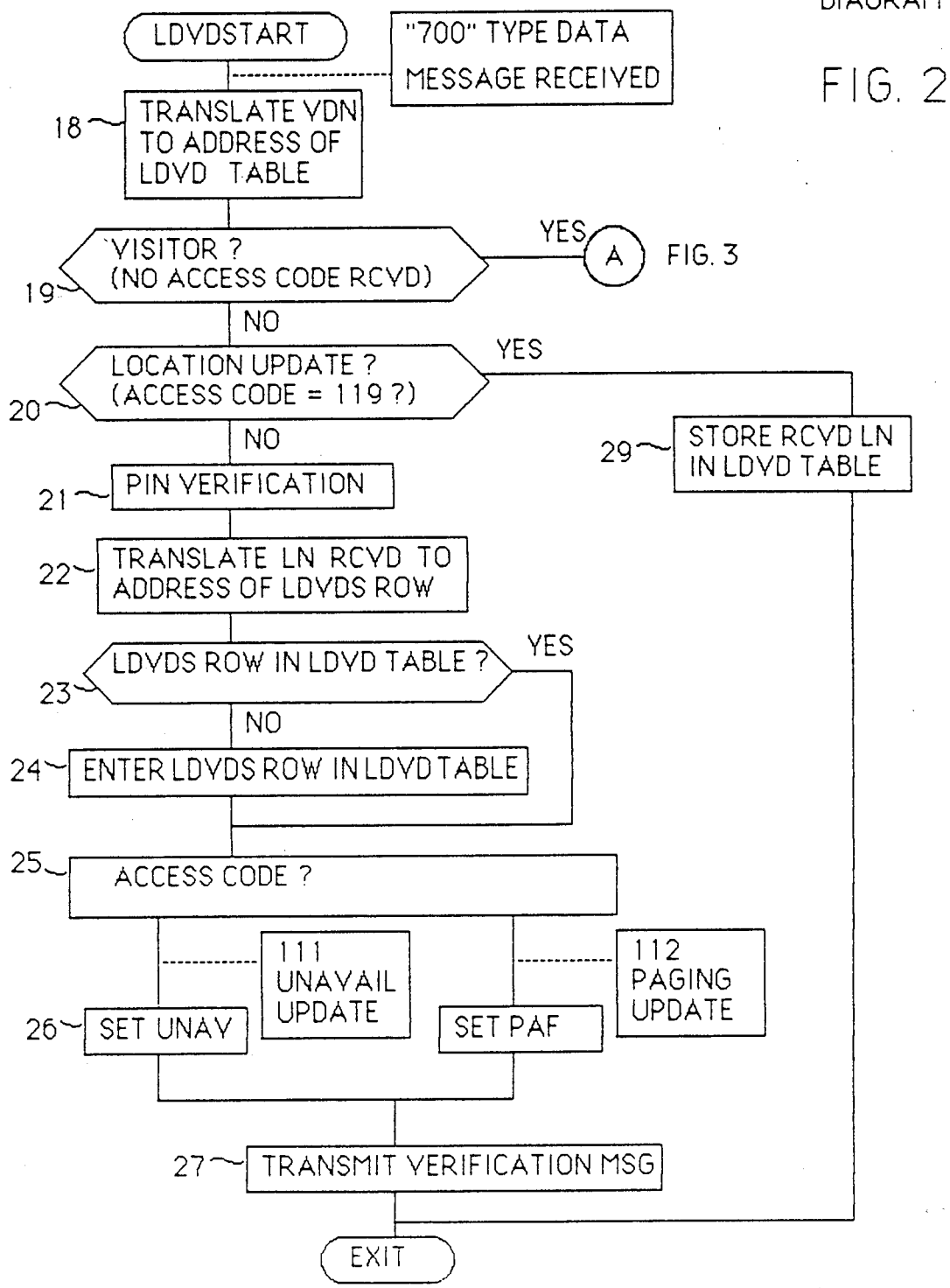
FIGS. 2 to 3 show illustrative flow diagrams of a location dependent visitor dispatching program at the data base of FIG. 1.
Figure 3:
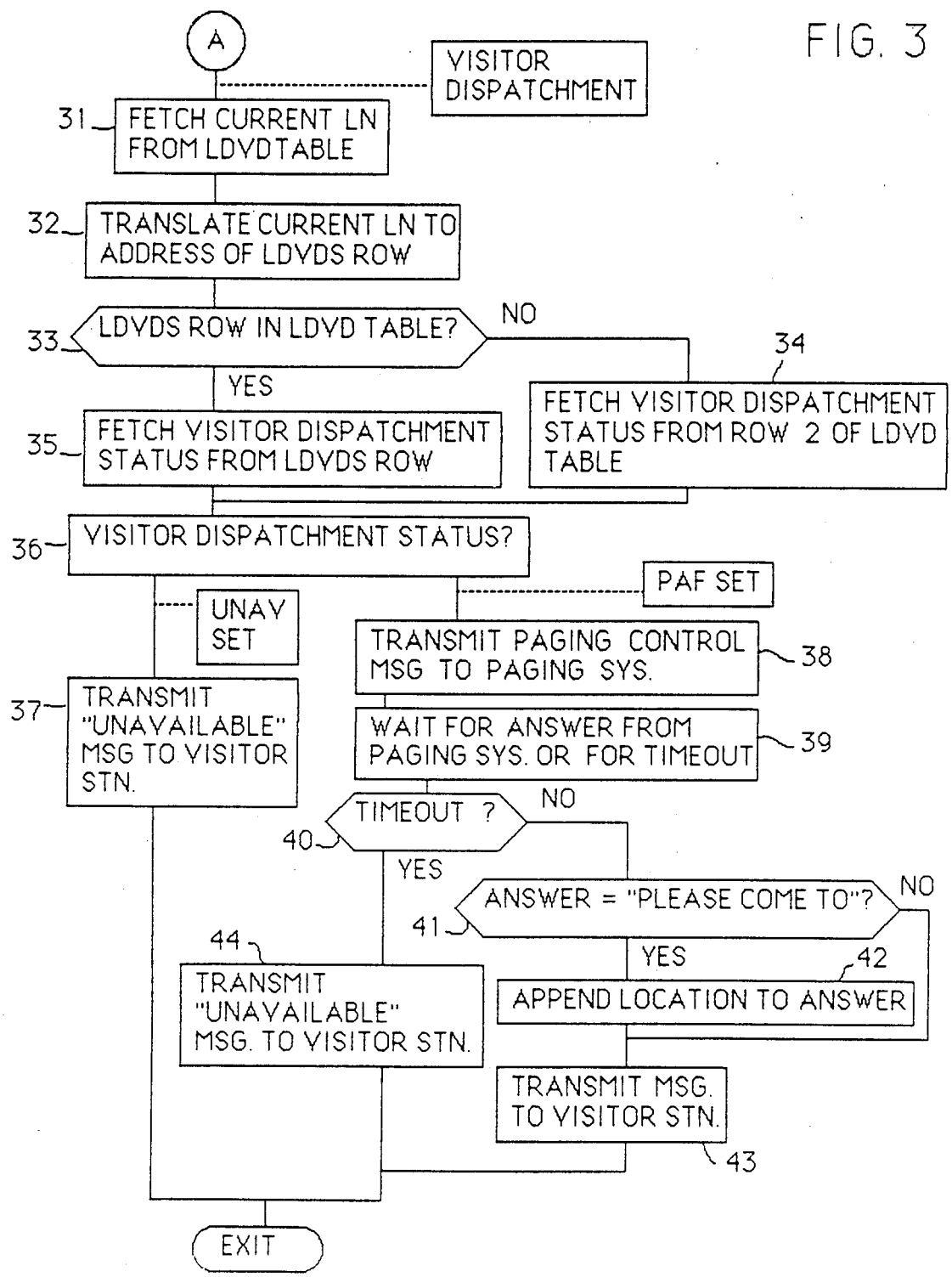

With reference again to our example in which subscriber A has initiated a visitor dispatchment update transaction, in FIG. 2 the LDVD program first translates at designation 18 the received VDN 583-1000 into a memory address which is the address of the LDVD table for subscriber A. Next, at designation 19 the access code portion of the data message is examined to determine if this transaction is a visitor transaction (no access code received), which is a transaction received when a visitor to subscriber A arrives. Since the transaction in question is a visitor dispatchment status update transaction from subscriber A, this test fails. At designation 20, the program examines the access code to determine if this is a location update transaction (access code equal to "119".) Since the transaction in question is a visitor dispatchment update transaction from subscriber A, this test fails. At designation 21, the program next verifies that an authorized party is making the visitor dispatchment update transaction, as is taught for example in Jordan and Weber U.S. Pat. No. 4,313,035. Here is is assumed that the update transaction is verified, and the program goes on to translate at designation 22 the received LN 222 into a memory address which is the address of the LDVDS row for room 15 in the LDVD table.

The result of the translation at 22 of the received LN into a LDVDS row address may be a null address, which indicates that the LDVDS row is not in the table. At designation 23 the program determines whether the LDVDS row is in the LDVD table by comparing the LDVDS row address with the null address. Here it is assumed that the LDVDS row is not already in the table, and at designation 24 the program goes on to enter a new LDVDS row for received LN 222 into the table and continues to designation 25. If the LDVDS row is already in the table, the program simply continues to designation 25. At designation 25, the program interprets the received access code, as is taught for example in Jordan and Weber U.S. Pat. No. 4,313,035. The result of interpreting the access code at designation 25 is stored in the LDVDS row for LN 222. In this example, since the access code is the digits "111", the UNAV flag in the LDVDS row for LN 222 is set by the program at designation 26.

Finally at designation 27, the program formulates a verification message and transmits it to paging system 1 which transmits it to subscriber A. The verification message includes an indication that the updata has been performed. At this point all data base operations pertaining to the visitor dispatchment update transaction are completed. The LDVD program releases control at EXIT to the main program of the data base.

Suppose that subscriber A also wishes to provide that all visitors directed to him while he is in room 16 be dispatched by paging subscriber A. To arrange this, subscriber A makes a second visitor dispatchment update transaction in a manner similar to that described above. Subscriber A may make a visitor dispatchment update transaction for every location number (LN) representing locations that subscriber A might frequent.

Suppose also that subscriber A wishes to provide a status for visitor dispatchment for all his visitors who arrive while he is in all other locations for which he has not specifically provided a visitor dispatchment status in the data base. To arrange this, subscriber A makes yet another visitor dispatchment update transaction in a manner similar to that described above except that subscriber A keys in a special LN which translates into the address of the default visitor dispatchment status row in the third row of the LDVD table.

Suppose also that subscriber A wishes to provide a method of visitor dispatchment for all visitors directed to him while he is out of the area monitored by personnel locating system 3. To arrange this, subscriber A makes yet another visitor dispatchment update transaction in a manner similar to that described above, except that subscriber A keys in a special LN which signifies the set of all locations outside the area monitored by personnel locating system 3.

Returning to the example situation, we assume that subscriber A moves from room 16 to room 15. We assume that subscriber A has been issued a portable transmitter. The portable transmitter is carried on the person of subscriber A and enables the personnel locating system 3 to monitor the location of subscriber A, as taught in White U.S. Pat. No. 4,275,385. In response to the change in location of subscriber A, the personnel locating system 3 formulates a data message containing the digits "700", the VDN of subscriber A, the LN of the new location of subscriber A, and the digits "119" (signifying a location update), and transmits the data message to the database 5 over the data communication network 4.

Again, data base 5 recognizes from the "700" digits that the received data message pertains to a LDVD type of transaction. Accordingly, program control is given to the location dependent visitor dispatching program. With reference again to FIG. 2, the data base program, after translating the VDN portion of the data message into the LDVD table address, at designation 20 determines from the access code that the data message pertains to a location update. Hence at designation point 29 the program extracts the LN from the data message and stores it in row 0 of the LDVD table, after which the LDVD program returns to the main program at EXIT.

From this time on until the information stored at data base 5 is again updated, all visitors directed to VDN 583-1000 will be dispatched according to the information stored in the data base. For example, assume that while subscriber A remains in room 15, a visitor B arrives at the office door of subscriber A and presses a button labeled "Ring" located on the visitor station 8 near the office door of subscriber A. In response, the visitor station transmits a data message comprising the information "700-583-1000" to data base 5 over the data communication network 9.

With reference again to FIG. 2, the program, after translating the VDN into the LDVD table address, at designation 19 determines from the absence of an access code that this is a visitor transaction. At this point, the program determines the manner in which the visitor is to be dispatched. This part of the flow diagram is shown at A in FIG. 3. At designation 31 the program fetches the current location (CLN) of subscriber A from row 0 of the LDVD table. Next, at designation 32 the program translates the CLN into a memory address which is the address of the LDVDS row for the CLN within the LDVD table. The result of the translation may be a null address, which signifies that subscriber A has not specified a visitor dispatchment status for the CLN. At designation 33 the program checks for a null address. If the address is null then the program fetches the visitor dispatchment status from the third row of the LDVD table at designation 34 and then continues to designation 36. In this case, the address is not null and the program, at designation 35, fetches the visitor dispatchment status from the LDVDS row for the CLN and continues to designation 36. At designation 36 in FIG. 3, the program interprets the visitor dispatchment status to determine how the visitor is to be dispatched. In the example at hand, the visitor dispatchment status indicates that the visitor is to be answered with a "not available" message. At designation 37 the program therefore formulates a dispatchment message, including a "not available" indication. The dispatchment message is transmitted to visitor station 8, after which the LDVD program returns to the main program at EXIT. In response to the dispatchment message, visitor station 8 displays a "not available" message to visitor B.

Returning to the example, suppose now that subscriber A moves from room 15 to room 16. In response to the movement of subscriber A, the CLN information in the database is updated to 223, the LN for room 16, as described above. Now suppose that visitor B makes another visit to subscriber A and again presses the button labeled "Ring" located on the visitor station 8 near the office door of subscriber A. At designation 36 in FIG. 3, the program interprets the visitor dispatchment status to determine how the visitor is to be dispatched. In the example at hand, the visitor dispatchment status in the LDVDS row for LN 223 in the LDVD table for VDN 538-1000, the VDN for subscriber A, indicates that the subscriber A is to be paged. At designation 38, the program therefore formulates a paging control message, including the VDN of subscriber A and the indication "visitor at your door", and transmits it to the paging system 1 over data communication network 2. Next, at designation 39 the program waits either for a response from the paging system indicating that subscriber A has responded to a page, or for a finite interval.

We assume that subscriber A has been issued a pager unit for receiving and sending signals via the paging system. In response to the paging control message, the paging system 1 pages subscriber A and displays the indication "visitor at your door" at the paging unit of subscriber A. In response to the page, subscriber A may press a button on his pager unit indicating a visitor dispatchment method. Here we assume that subscriber A presses a button labeled "Please come to". In response to the pressing of the button, paging system 1 formulates a page answer message, including the indication "Please come to" and transmits it to the database 5 over data communication network 2. In response to receipt of the page answer message, the program resumes execution at designation 40.

At designation 40 the program determines whether a page answer message was received from the paging system 1 or a finite interval has elapsed since the paging control message was sent. In this case, since a page answer message was received, at designation 40 the program proceeds to designation 41. At designation 41 the program examines the page answer message to determine whether the indication is "please come to". In this case, it is, so at designation 42, the program appends an indication of the current location of subscriber to the indication "please come to" and then the program continues to designation 43. If at designation 41 the indication is not "please come to" then the program continues to designation 43. At designation 43, the program formulates a visitor station display message, including the indication from the page answer message, and transmits the visitor station display message to the visitor station 8. Then the program returns to the main program at EXIT. In response to the visitor station display message, visitor station 8 displays the indication in the visitor station display message to visitor B. In this case, "please come to room 16" is displayed.

Suppose that in the last example, subscriber A did not respond to the page. Then the program does not receive a page answer message before a finite interval elapses, and at designation 40 the program proceeds to designation 44 where the program formulates a visitor station display message containing the indication "unavailable" and transmits the visitor station display message to the visitor station.

Many messages may be displayed to visitors. For example, subscriber A may push buttons on the pager unit causing "not available", "please leave a message", or "please see the person in room xxx" messages to be displayed to the visitor.

Note that subscriber A does not have to make visitor dispatchment update transactions to change the visitor dispatchment status each time subscriber A moves from one location to another.

Returning to the example, suppose now that subscriber A leaves the area monitored by the personnel locating system 3. In response, the CLN information in the database is updated to a special LN which signifies that subscriber A is out of the area monitored by the personnel locating system 3. Now suppose that visitor B makes another visit to subscriber A. This time, the visitor is dispatched by whatever method of visitor dispatchment is specified in the row for the special LN.

Many other enhancements may be provided for location dependent visitor dispatching service. An alternative arrangement may be provided which is particularly useful for providing location dependent visitor dispatching serviced to visitors who do not know the location of the office of a subscriber. This arrangement may be based on a central visitor station where a visitor may select the name of a subscriber, whereupon the visitor is dispatched in a manner similar to that described above. If a subscriber is paged, then the subscriber is informed that the visitor is at a central station.

As another enhancement, a method of visitor dispatchment may be provided that forwards a visitor to another VDN. For example, a subscriber A may specify that a visitor directed to himself be forwarded to the VDN of his secretary. A visitor to subscriber A is not sent to the visitor station of the secretary but instead is given a message to remain at the visitor station of subscriber A. Then the visitor is dispatched according to the visitor dispatchment status of the secretary. In dispatching the visitor according to the visitor dispatchment status of the secretary, the secretary may be informed that the visitor is a visitor to subscriber A and is standing at the visitor station of subscriber A. Thus a visitor to subscriber A may be dispatched to his secretary even if his secretary is not in the room where his secretary normally stays.

Many visitor dispatchment methods may be provided. A method of visitor dispatchment may be provided that displays the location of the subscriber without paging the subscriber. A method of visitor dispatchment may be provided that displays a message that the subscriber may specify. A method of visitor dispatchment may be provided that accepts a message from visitors.

It is to be understood that the above-described arrangements are merely illustrative of the application of the principles of the invention and that numerous other arrangements may be devised by those skilled in the art without departing from the spirit and scope of the invention.

I claim:

1. A method of providing visitor dispatching service in a system comprising a plurality of visitor stations, a data base, a personnel locating system, a data communications network interconnecting said data base with said visitor stations, and a data communications network interconnecting said data base with said personnel locating system, said method comprising the steps of:
   responsive to changes in the location of a subscriber, storing at said data base information specifying the current location of the subscriber;
   under direct control of said subscriber, storing at said data base information specifying the status of the subscriber for visitor dispatchment while said subscriber is at each location;
   responsive to a visitor indicating at a visitor station a desire to see said subscriber, addressing said data base to examine the stored information specifying the current location of said subscriber;
   responsive to a receipt of said information specifying the current location of said subscriber from said data base, addressing said data base to examine the stored information specifying the status of the subscriber for visitor dispatchment while said subscriber is at said current location; and
   responsive to a receipt of said information specifying the status of the subscriber for visitor dispatchment while said subscriber is at said current location from said data base, dispatching the visitor according to said status information.

2. The method of claim 1 wherein dispatching the visitor comprises displaying a message to the visitor.

3. The method of claim 1 wherein dispatching the visitor comprises the steps of:
   composing a message according to said status information; and
   displaying the message to the visitor.

4. The method of claim 1 in which the system also further comprises a paging system and a data communications network interconnecting said data base with said paging system, and in which dispatching the visitor comprises paging the subscriber.

5. The method of claim 4 in which the paging system includes means for a paged subscriber to answer a page, and in which the method is further characterized by:

accepting a second status for visitor dispatchment from the subscriber; and responsive to a receipt of said status for visitor dispatchment from said subscriber, dispatching the visitor from the visitor station according to said second status for visitor dispatchment.

6. A method of automatically deriving location dependent visitor dispatching service data from a data base characterized by:

in response to information received from a personnel locating system, storing said information at said data base, said information specifying the current location of an entitled customer;

storing at said data base information, said information specifying a plurality of associations between visitor dispatchment methods and locations;

in response to control signals received from a communication system, addressing said data base to examine said information specifying the current location of said customer;

addressing said data base to examine any method of visitor dispatchment associated with said current location of said customer; and returning from said data base to said communication system coded data signifying said any method of visitor dispatchment.

* * * * *